United States Patent [19]

Rabinovich

[11] Patent Number: 4,611,834
[45] Date of Patent: Sep. 16, 1986

[54] UNRESTRICTED SWIVEL JOINT

[76] Inventor: Joshua Rabinovich, 358 Chestnut Hill Ave., Boston, Mass. 02146

[21] Appl. No.: 687,919

[22] Filed: Dec. 31, 1984

[51] Int. Cl.⁴ .............................................. F16L 27/00
[52] U.S. Cl. ...................................... 285/131; 285/136; 285/168; 285/276; 285/912; 285/181; 285/282
[58] Field of Search ............... 285/136, 168, 276, 281, 285/305, DIG. 13, 179, 181, 122, 282, 131, 134

[56] References Cited

U.S. PATENT DOCUMENTS

| | | | |
|---|---|---|---|
| 1,781,457 | 11/1930 | Gold et al. | 285/168 |
| 2,587,938 | 3/1952 | Warren | 285/168 X |
| 2,745,682 | 5/1956 | Chevallier | 285/168 X |
| 2,749,151 | 6/1956 | Lyons | 285/305 X |
| 2,879,083 | 3/1959 | Corsette | 285/168 X |
| 2,907,590 | 10/1959 | Oswald | 285/281 |
| 3,245,702 | 4/1966 | Smith | 285/305 |
| 3,759,553 | 9/1973 | Carter | 285/305 X |
| 3,767,234 | 10/1973 | Weirich et al. | 285/305 |
| 3,900,221 | 8/1975 | Fouts | 285/276 |
| 3,949,778 | 4/1976 | Woodford et al. | 285/136 X |
| 3,973,791 | 8/1976 | Porta et al. | 285/305 |
| 3,990,731 | 11/1976 | Schnipke | 285/136 |
| 4,059,295 | 11/1977 | Helm | 285/305 |
| 4,103,938 | 8/1978 | Lasater et al. | 285/136 |
| 4,185,841 | 1/1980 | Brundage | 285/276 X |
| 4,239,262 | 12/1980 | Krupp et al. | 285/158 X |
| 4,260,183 | 4/1981 | Krupp | 285/136 X |

FOREIGN PATENT DOCUMENTS 8302815  8/1983  PCT Int'l Appl. ................. 285/305

Primary Examiner—Cornelius J. Husar
Assistant Examiner—Eric K. Nicholson
Attorney, Agent, or Firm—M. Lawrence Oliverio

[57] ABSTRACT

An unrestricted, leakproof, rotatable fluid flow joint comprising: a flexible rod mechanism, a first elbow, a second elbow, and a resilient O-ring; the first elbow including a mechanism for rotatably receiving the second elbow, a mechanism for rotatably connecting the elbows with the flexible rod mechanism, and a mechanism for guiding the flexible rod into the mechanism for rotatably connecting the second elbow including a mechanism for rotatably mating with the mechanism for receiving and mechanism for rotatably connecting the elbows wherein the flexible rod slidably inserts within at least a portion of the mechanism for rotatably connecting to connect the first and second elbows; and wherein at least one of the elbows includes a mechanism for holding the O-ring between the flexible rod and the end of the second elbow, the O-ring disposed in resilient contact with and between the mechanism for receiving and the mechanism for mating.

5 Claims, 5 Drawing Figures

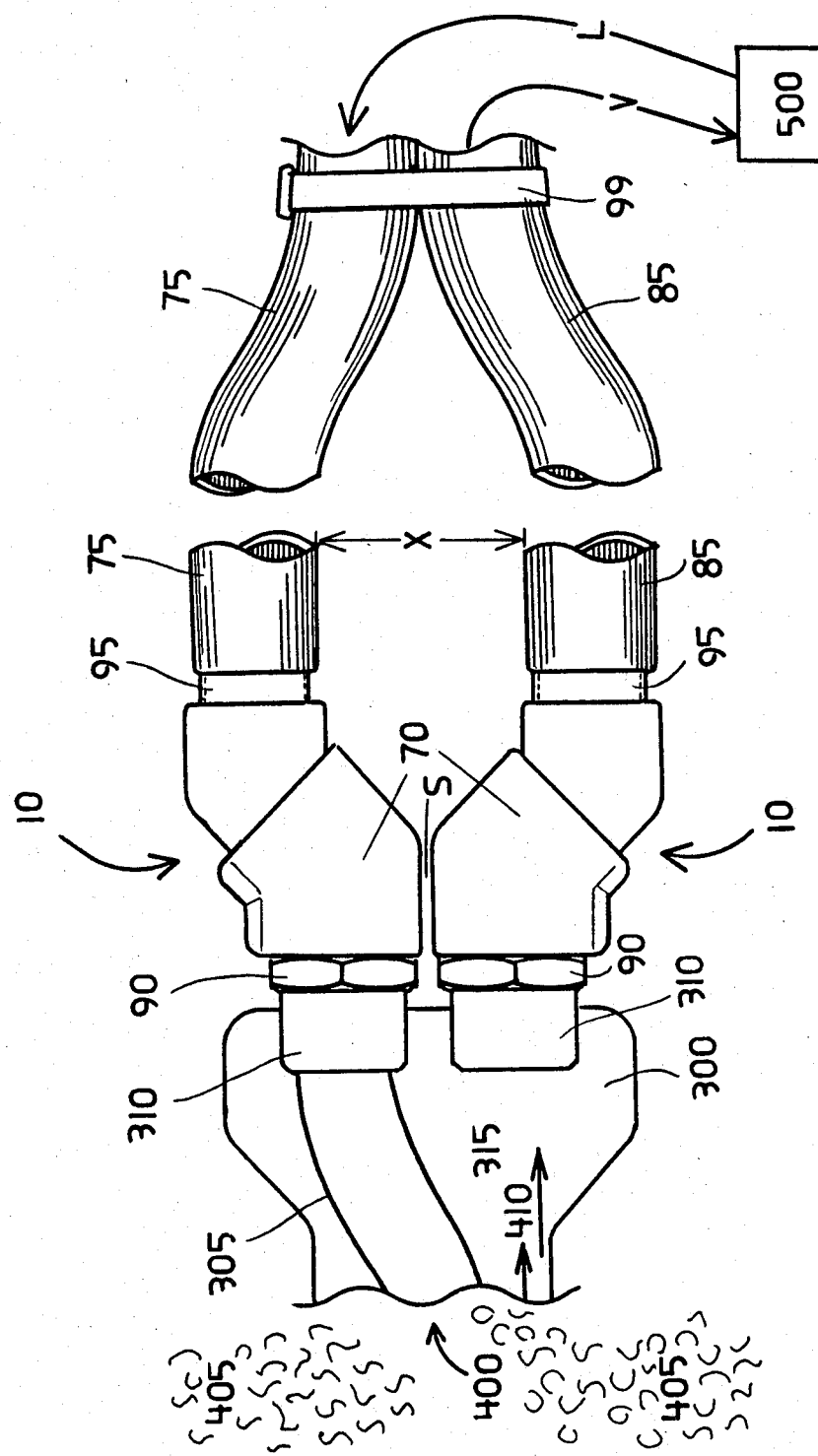

UNRESTRICTED SWIVEL JOINT

BACKGROUND OF THE INVENTION

The present invention relates to swivel joints for fluid flow tubes and particularly to unrestricted swivel joints. Such rotatable swiveling devices are useful in delivering fluids from one source to another, whereby the user of the swivel joint can more easily manipulate a nozzle or a hose (such as a gasoline delivery nozzle or hose) to direct the delivery of flow to a particular source.

Prior art swivel devices used in connection with the pumping of fluids typically result in a restriction in the fluid line as a result of the swiveling action thereby restricting or otherwise interrupting the flow of fluid therethrough.

In order to prevent leakage of fluid through the swivel joint which occurs as a result of wear and abrasion at the swivel joint area, one or more rubber O-rings are typically provided in the joints of prior art swivel devices. Such devices typically wear out prematurely requiring relatively complex disassembly of the swivel joint and replacement of the O-rings which have worn out due to abrasion caused by repeated swiveling.

SUMMARY OF THE INVENTION

The present invention provides an unrestricted swivel joint for use in delivering fluids through the joint. The swivel joint comprises two elbows, one insertable within the other. The elbows are readily assemblable and disassemblable. A flexible rod means is provided which is readily insertable and readily removable from a mechanism provided on the elbows for connecting the elbows. The elbows are rotatable relative to each other around the flexible rod once inserted. The flexible rod means comprises the primary source of bearing on which frictional sliding and swiveling of one elbow relative to the other occurs. The flexible rod means typically comprises a relatively hard, non-resilient organic material such as nylon and the elbows typically comprise a metal.

Metal to metal abrasion between the elbows is minimized both by use of the rod means as the primary source of bearing and by placement of the rod means at a location along the joint area between the elbows which is widely spaced from the terminal end of the elbow which is inserted into the receiving elbow. Such wide spacing of the rod means from the area of metal to metal contact reduces the abrasion forces at the metal to metal contact areas.

An O-ring is provided downstream of the metal to metal contact area and upstream of the rod means further reducing the abrasion between the metal by allowing any passing fluid to lubricate any available annular space between the metal to metal contact area.

BRIEF DESCRIPTION OF THE DRAWINGS

Other objects, features and advantages of the invention will be apparent from the following detailed description of preferred embodiments when taken in connection with the accompanying drawings, in which:

FIG. 4 is an isometric view of two swivel joints with means or limiting the degree of coaxial rotation between the two joints according to the invention.

DETAILED DESCRIPTION OF PREFERRED EMBODIMENTS

The following discussion describes the most preferred embodiments to the invention with reference to the figures.

Figure 1:
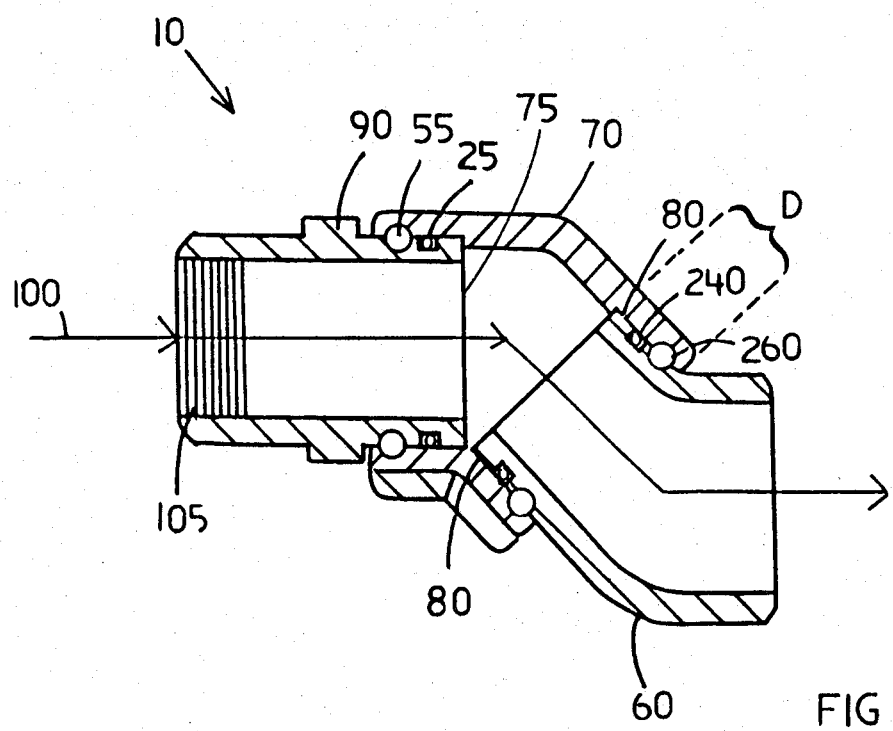
FIG. 1 is a cross-sectional view of a swivel joint according to the invention.

FIG. 1 depicts a doubly jointed swivel device 10 having a first female elbow 70, a second male elbow 60 inserted into and connected to one end of the female elbow 70, and a plug 90 inserted into and connected to another end of the female elbow 70.

Figure 2:
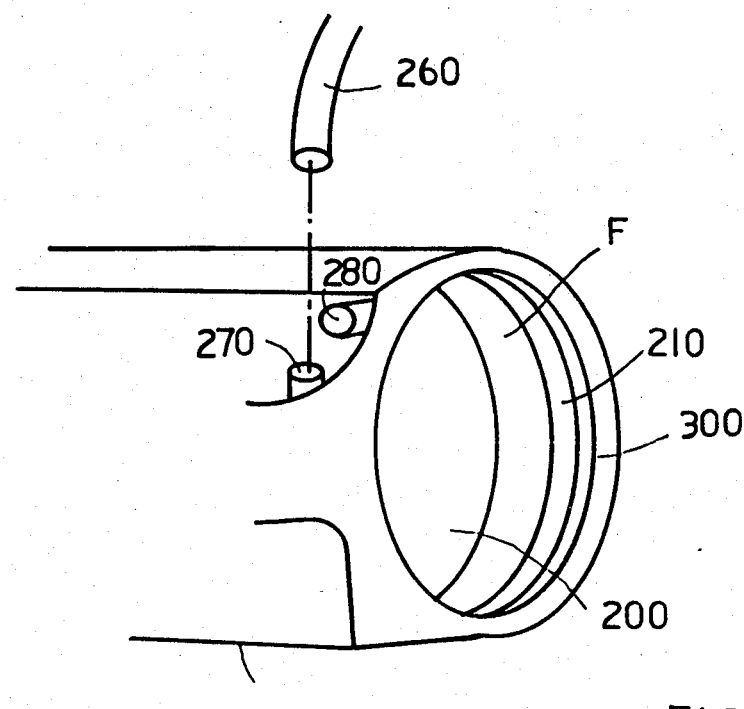
FIG. 2 is an isometric view of the open end mating area of a female elbow for use in a swivel joint according to the invention.
Figure 3:
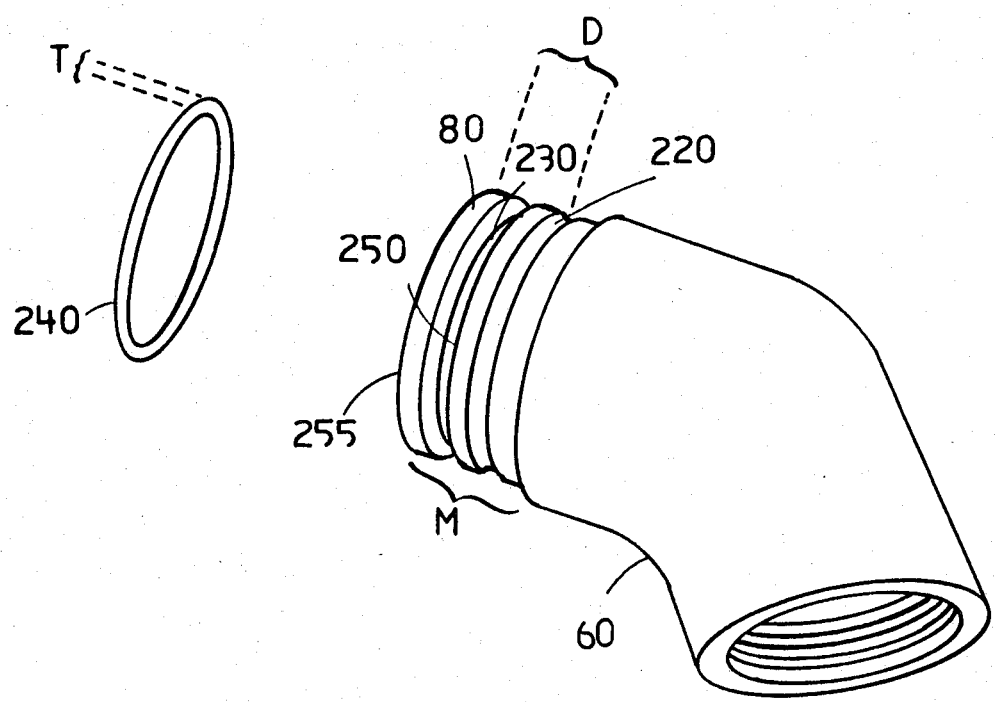
FIG. 3 is an isometric view of the mating area of a male elbow for use in a swivel joint according to the invention.

The female elbow 70 has a generally circular aperture 200, FIG. 2, into which a mating plug M, FIG. 3, on the male elbow 60 is inserted. Once the male plug M is inserted into aperture 200 a groove 210 in the female elbow mating area F is aligned with a complementary groove 220 in the male plug M. The male plug M is typically provided with another groove 230 into which a resilient (typically rubber) O-ring 240 is inserted having a thickness T wide enough to extend outside groove 230 and contact mating area F of female elbow 70 (when M is inserted into aperture 200) under pressure such that any fluid 100, FIG. 1, passing through the continuous tubular cavity of elbows 60, 70 cannot leak past the outside mating surface of O-ring 240 with mating area F of female elbow 70. O-ring 240, therefore, prevents leakage of fluid 100 past projection 250 which separates grooves 230, 220.

With reference to FIGS. 2 and 3, once male plug M is inserted into aperture 200 and grooves 220 and 210 are aligned, a flexible rod 260 is guided into the complementary mating grooves 210, 220 through guide aperture 270. Guide apertures 270, 280 communicate from the outside surface of female elbow 70 with grooves 210. Flexible rod 260 is typically lubricated prior to insertion through guide aperture 270 and slidably pushed through guide aperture 270 into and around the circumference of mating grooves 210, 220, at least about 180°. The circular cross-sectional area of flexible rod 260 and typically about 180° to about 270° is approximately equal to and slightly smaller than the circular cross sectional area of the groove created by the mating of complementary grooves 210, 220. Once flexible rod 260 is inserted into mating grooves 210, 220 elbows 60, 70 are connected by virtue of the protrusion of the diameter of rod 260 above lip 300 on female elbow 70 and above projection 250 on male elbow 60.

Once flexible rod 260 is seated within groove 210 the two elbows 60, 70 are rotatable with respect to each other and the vast majority of the frictional force created by such rotation is absorbed by frictional rod 260 thereby serving to protect the integrity of O-ring 240 which would otherwise be subjected to a great deal of friction eventually causing destruction of the seal between mating area F of elbow 70, FIG. 2, and between O-ring 240 and groove 230 of elbow 60, FIG. 3. The life of such seal between O-ring 240 and elbows 60, 70 is thus greatly increased by the action of flexible rod 260 in absorbing most or essentially all of the friction created by rotation of elbows 60, 70 relative to each other.

Male plug M, FIG. 3, may be increased in width and provided with additional grooves (similar to groove 230) for placement of additional O-rings (similar to O-ring 240) between flexible rod groove 220 and the end 255 of male plug M. Where additional O-rings are provided, mating area F, FIG. 2, on the inside of elbow 70 must be widened an amount sufficient to provide a mating surface area for each of the additional O-rings.

The widening of male plug M, FIG. 3, for the purpose of providing additional O-rings or otherwise, is advantageous because such widening decreases the frictional bearing forces which occur between surface 80 (typically metal) and mating area F, FIG. 2, when elbows 60, 70 are rotated or otherwise manipulated relative to each other. By increasing the width of plug M, FIG. 3, the distance D between groove 220 and the end 255 of plug M is increased. Inasmuch as groove 220 is typically the center of rotation along the transverse axis, A, of elbow 60, the greater the distance D between groove 220 and end 255, the less frictional force is created between surfaces 80 and mating area F, FIG. 2. The provision of additional O-rings also increases the liquid sealing capacity of the joint.

With reference to FIG. 1, plug 90, is inserted into and rotatably attached to elbow 70 in essentially the same manner as elbows 60, 70 are rotably attached. As shown in FIG. 1 the rotatable joint between elbow 70 and plug 90 includes a flexible rod 55, O-ring 25, and other joint configuration elements similar to those joining elbows 60, 70 including grooves 220, 230, mating surfaces 265, 250 as described with reference to the joint of FIGS. 1 and 2. Elbow 70 and plug 90 are, therefore, rotatable with respect to each other in the same manner as elbows 60, 70 are rotatable.

As described with reference to the rotatable joint connection between elbows 60, 70, the primary source of bearing of the friction at the rotatable joint connection between plug 90 and elbow 70 is borne by flexible rod 55. Similarly as described with reference to O-ring 240 seated within groove 230, FIG. 3, O-ring 25 effects a fluid leakproof seal between the end 75 of plug 90 and flexible rod 55. The length of the bearing between the end 75 of plug 90 and flexible rod 55 may also be extended to include further grooves and O-rings in addition to O-ring 25.

Plug 90 typically includes threads 105, FIG. 1, for conventional non-rotatable screw insertion into another device such as a fluid dispensing nozzle 300, FIG. 4. As depicted in FIG. 4 the invention further contemplates mounting two (or more) rotatable elbow joints 10 within a nozzle 300, such that the female elbows 70 of each of joints 10 are disposed in back to back relationship to each other, see for example the rear view of FIG. 5.

With reference to FIG. 4, the back outside surfaces of the female elbows 70 are disposed in close face to face relationship at area S whereby a means for limiting the rotation of elbows 70 relative to each other may be most effectively provided. Without provision for limiting such rotation, it can be seen from FIG. 4, that elbows 70 could rotate freely relative to each other by virtue of the provision of the rotatable joint, described above with reference to FIG. 1, between plugs 90 and elbows 70, FIGS. 1, 4.

The purpose of providing two swivel joints on a fluid dispensing device or nozzle 300, FIG. 4, is to allow one of the swivel joints, e.g. the lower swivel joint 10 as shown in FIG. 4 to act as a vapor recovery means. Nozzle 300 may be provided with a liquid delivery tube 305 assembly communicating with the end of plug 310. A flow of liquid L, such as gasoline, is typically pumped as shown in FIG. 4 from a gasoline tank 500 through a flexible tube 75 which communicates with the upper joint 10 shown in FIG. 4 and eventually through tube 305 in nozzle 300. Tube 305 typically leads to a spout end 400 of nozzle 300.

As the liquid L is delivered out the spout end of nozzle 300 the liquid L typically emits vapor fumes 405. When the liquid L is delivered, as it typically is, into a gas tight environment such as an automobile gasoline tank (not shown), the liquid L displaces the gas in the closed gas tight environment and forces the vapor fumes 405 backwardly in the direction of arrows 410, FIG. 4. Nozzle 300 is provided with a boot or cavity area 315 sealably surrounding tube 305 and communicating with the end of the lower plug 310 shown in FIG. 4. The continuous delivery of liquid L out the spout end 400 of nozzle 300 in turn causes the continuous forcing of vapor 405 in the direction of arrows 410 through cavity 315, lower joint 10 and eventually through the tube 85 which is connected to the end of lower joint 10 and typically leads a flow of vapor V back to the gasoline tank 500 from where liquid L is being pumped through tube 75.

Tubes 75, 85 are typically comprised of a flexible material such as rubber and may be sealably connected to the ends of joints 10 via pressure strap means 95. In order to minimize and synchronize the degree of rotation of joints 10 relative to each other tubes 75 and 85 are typically strapped together via a tie 99 which holds tubes 75, 85 together near the point where tubes 75, 85 are connected to joints 10. As shown in FIG. 4 such a tie is usually attached to both of tubes 75, 85 at some point down along the length of tubes 75, 85 shortly after the position pointed to as X.

Figure 5:
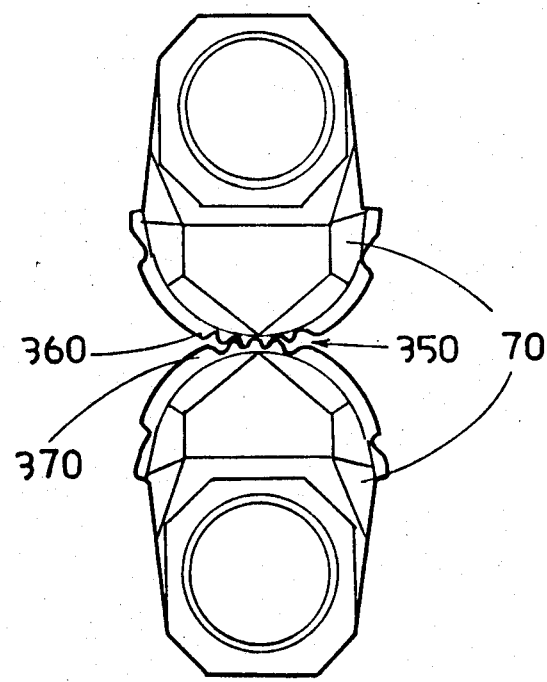
FIG. 5 is a rear view of FIG. 4 showing the preferred means of limiting coaxial rotation between the two swivel joints according to the invention.

As shown in FIG. 5, the preferred disposition of two swivel joints used in the manner described above is in mirror image relationship. The preferred means of limiting and synchronizing the rotation of joints 10 relative to each other is via a complementary set of gear teeth 350 disposed on the back outside surfaces of each of elbows 70 of joints 10. As shown the gear teeth 350 on each of elbows 70 extends over an arc of predetermined length such that the relative rotation of the elbows is limited by the length of the gear teeth.

As shown in FIG. 5 when one of the elbows 70 rotates in one direction, e.g. 10 degrees counterclockwise, the other of the joints 10 must by virtue of the mirror image interlocking of gear teeth 350, rotate in a synchronous manner in the opposite direction, e.g. 10 degrees clockwise. The net effect of tying the hoses 75, 85 together at or near the place of connection of tubes 75, 85 to joints 10, will result in essentially the same synchronous limitation of joints 10 relative to each other.

Typical mechanisms which could be used to limit the relative rotation of the elbows 70 are stops (such as element 360, FIG. 5) projecting outwardly from the back outside surface of at least one of the elbows 70 and a means on the other of the elbows 70 for engaging the stops. A typical means for engaging comprises a projection, aperture, or wedge (such as element 370, FIG. 5).

The flexible rod 260 which is used as the source of primary frictional bearing in the rotatable joints 10 of the invention typically comprises nylon or other conventional organic polymer material which is resistant to frictional abrasion. The flexible rod 260 is typically coated with a lubricant prior to insertion in a connecting joint groove, such as groove 210, FIG. 2, and a flexible rod may be readily removed by a service/repair person for periodic lubrication or replacement of a bearing rod.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and technique herein disclosed and limited solely by the spirit and scope of the appended claims.

What is claimed is:

1. Fluid delivery apparatus having first and second unrestricted, leakproof, rotatable fluid flow joints, each joint comprising:
    a flexible rod means;
    a first elbow;
    a second elbow; and
    a resilient O-ring;
    the first elbows including means for rotatably receiving the second elbows, means for rotatably connecting the elbows with the flexible rod means, and means for guiding the flexible rod into the means for rotatably connecting,
    the second elbows including means for rotatably mating with the means for receiving and means for rotatably connecting the elbows;
    wherein the flexible rod means slidably inserts within at least a portion of the means for rotatably connecting to connect the first and second elbows; and
    wherein at least one of the elbows includes means for holding the O-ring between the flexible rod and the end of the second elbow, said O-ring disposed in resilient contact with and between the means for receiving and the means for mating; and
    a fluid dispensing means, wherein the first elbows of each joint are rotatably mounted within the fluid dispensing means in back to back relationship such that the back outside surfaces of the first elbows of the joints are disposed in close face to face relationship, each of the back outside surfaces of the first elbows facing each other including means for limiting the degree of coaxial rotation of the first elbows relative to each other.

2. Fluid delivery apparatus having first and second unrestricted, leakproof, rotatable fluid flow joints, each joint comprising:
    a flexible rod means;
    a first elbow;
    a second elbow; and
    a resilient O-ring;
    the first elbows including means for rotatably receiving the second elbows, means for rotatably connecting the elbows with the flexible rod means, and means for guiding the flexible rod into the means for rotatably connecting,
    the second elbows including means for rotatably mating with the means for receiving and means for rotatably connecting the elbows;
    wherein the flexible rod means slidably inserts within at least a portion of the means for rotatably connecting to connect the first and second elbows; and
    wherein at least one of the elbows includes means for holding the O-ring between the flexible rod and the end of the second elbow, said O-ring disposed in resilient contact with and between the means for receiving and the means for mating; and,
    a fluid dispensing means, wherein the first elbows of each joint are rotatably mounted within the fluid dispensing means in back to back relationship such that the back outside surfaces of the first elbows of the joints are disposed in close face to face relationship, the back outside surfaces of the first elbows facing each other including a set of interlocking gear teeth extending over an arc of predetermined length.

3. The apparatus of claim 1 wherein the means for limiting the degree of rotation of the first elbows relative to each other comprises one or more stops projecting outwardly from the back outside surface of at least one of the first elbows and means for engaging each of the stops on the back outside surface of the other of each of the first elbows, each of the stops engageable with each of the means for engaging upon rotation of the first elbows relative to each other through a predetermined degree of rotation.

4. The apparatus of claim 3 wherein the means for engaging is selected from the group consisting of a projection for mating with the stops, an aperture for receiving the stops and wedge means for mating with the stops.

5. The apparatus of claim 1 wherein the first elbows are rotatably mounted within the fluid dispensing means in mirror image relationship.

* * * * *